Aug. 29, 1939.  B. G. CARLSON  2,171,265
AIRCRAFT TRIM INDICATOR
Filed March 22, 1938  2 Sheets-Sheet 1
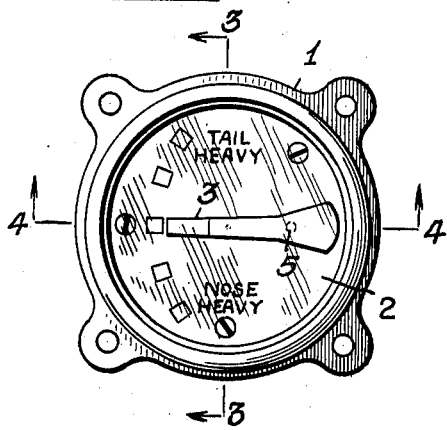
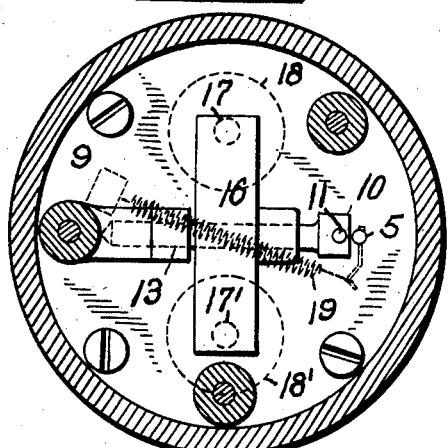
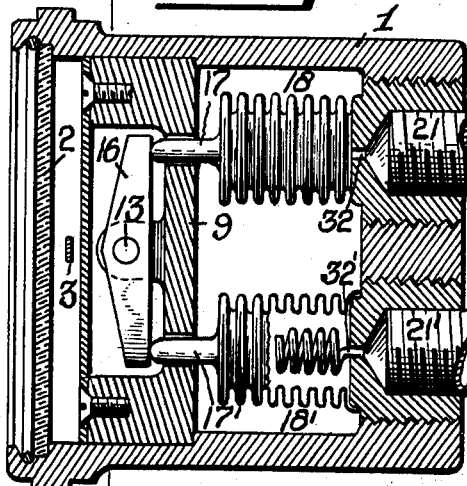
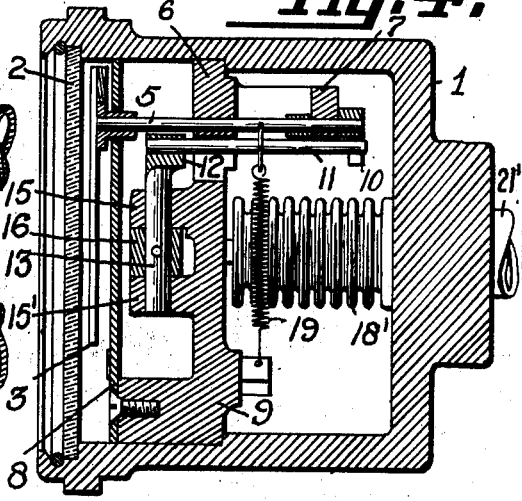
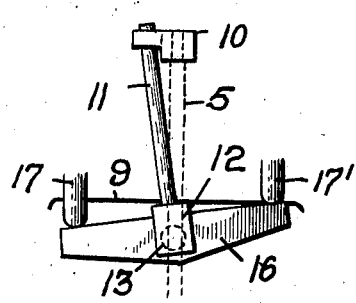
INVENTOR
BERT G. CARLSON
BY
Herbert H. Thompson
HIS ATTORNEY Aug. 29, 1939.  B. G. CARLSON  2,171,265
AIRCRAFT TRIM INDICATOR
Filed March 22, 1938  2 Sheets-Sheet 2
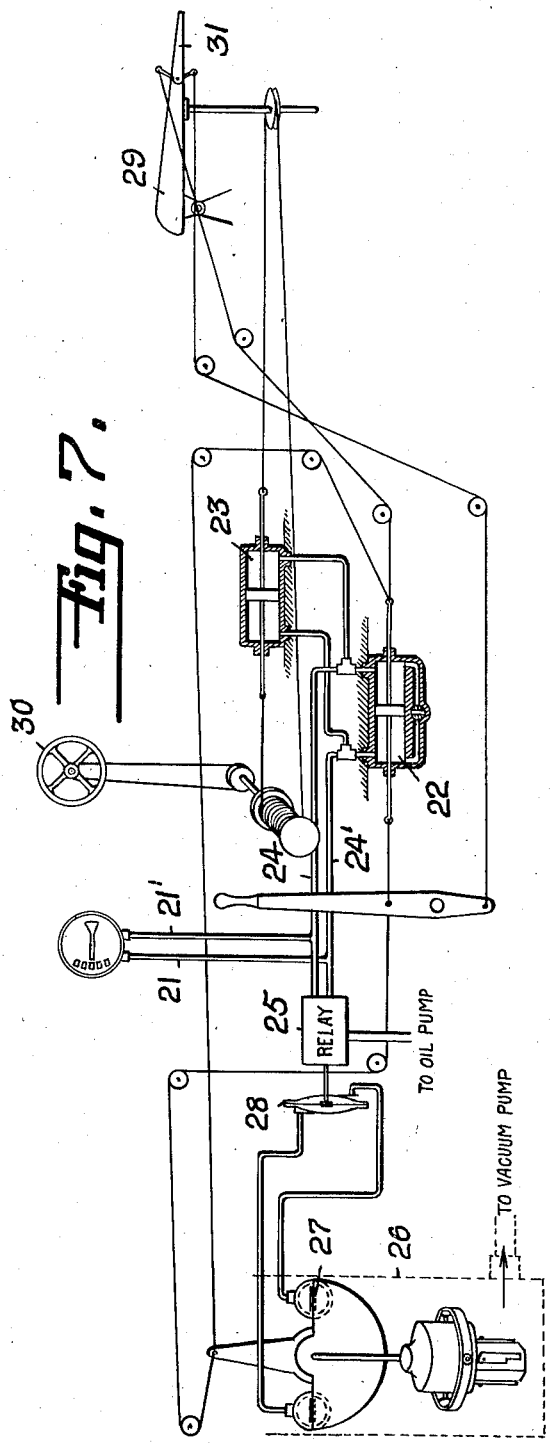
INVENTOR
BERT G. CARLSON
BY
HIS ATTORNEY Patented Aug. 29, 1939

2,171,265

UNITED STATES PATENT OFFICE 2,171,265

AIRCRAFT TRIM INDICATOR

Bert G. Carlson, Freeport, N. Y., assignor to The Sperry Gyroscope Company, Inc., Brooklyn, N. Y., a corporation of New York Application March 22, 1938, Serial No. 197,365

4 Claims. (Cl. 244—78)

This invention relates to a trim indicator for aircraft to provide a visual indication of nose or tail heaviness of an airplane in flight. It is especially adapted for aircraft equipped with a fluid pressure servomotor system, whether with or without a completely automatic control. In modern aircraft it is usual to provide the plane with both a servo elevator or control surface and an auxiliary or trim adjusting control surface, the latter being adjusted only when the plane is out of trim longitudinally. My invention therefore furnishes a ready indication to the aviator of when and how to adjust the trim control surface. It will also be of service in an airplane equipped with a complete automatic pilot having an automatic trim control means, such as shown in my prior Patent No. 2,045,579, dated June 30, 1936, for Automatic level control for aircraft. In this case my indicator acts as a means for checking the automatic trim control operation.

Normally, if a craft is equipped with an automatic pilot but not with automatic trim control, the aviator has no means of knowing whether or not his ship is out of trim, because the automatic device compensates for trim without adjusting the trim tabs. If for some reason he decides to shut down the automatic steering device in order to fly manually, as when preparing to land, the sudden back thrust of the now released control surfaces will throw the ship out of balance and, if close to the ground, may endanger the ship. My novel indicator warns the aviator to adjust the trim tabs before taking over control from the automatic pilot, thereby preventing any sudden and unexpected deviations of the plane from its proposed course.

Referring to the drawings:

Fig. 1 is a face view of my trim indicator.

Fig. 2 is a vertical section of the same on line 2—2 of Fig. 3.

Fig. 3 is a vertical section of the same on line 3—3 of Fig. 1.

Fig. 4 is a transverse section of the same on line 4—4 of Fig. 1.

Fig. 5 is a detailed plan view of the operating linkage for the indicator.

Fig. 6 is a detail of the pin and slot connection between the arm operated by the bellows and the indicator shaft.

Fig. 7 is a diagram illustrating one method of connecting my indicator in a system employing an automatic pilot with automatic trim control.

My trim indicator is housed within a casing 1 having a front window 2 through which the indicating pointer 3 is observed. Said pointer is shown as secured to a shaft 5 journalled within said casing on spaced bearings 6 and 7, the interior mechanism being hidden by a mask 8 secured to the front of the casting 9 within the instrument. At its rear end, the shaft 5 is shown as provided with a U-shaped member 10 in the notch of which rests one end of an arm 11 which is secured at its opposite end within a boss 12 on a shaft 13 journalled in forward extending bearing members 15 and 15' on member 9. To said shaft is also pinned a rocker arm 16 which is engaged at each end by pins 17 and 17' projecting from expansible containers 18 and 18' so that as one container expands and the other contracts the arm rocked to rotate shaft 13 and rock arm 11, as indicated in Fig. 5, to rotate the shaft 5 and thereby move the indicator 3. The base of each container is adjustably threaded in the housing for the purpose of aiding in the adjustment. A spring 19 is secured at one end to part 9 and at the other end to an arm 20 extending from shaft 5, said spring being for the purpose of taking up the back lash in the linkage.

Each of flexible containers or sylphons 18 and 18' are respectively connected through the fine bores of coiled tubing 32, 32', to pipes 21 and 21', which restrictions are for the purpose of averaging out pressure variations in the two pipes. This tubing has capillary action, and this action can be regulated by varying the total length of the capillary tubing to suit the particular condition of the service and installation. Obviously, the longer tubing 32 and 32' becomes and the narrower the bore, the longer it will take for a given pressure to expand the bellows 18 or 18' to its full extent, so that the time constant of the device is approximately proportional to $$\frac{1}{d \times P}$$

where $d$ is the capillary diameter, $l$ the capillary length and P the fluid pressure. As bellows 18 has to deflate while bellows 18' inflates, the capillary action is doubled. The coiling of the tubing is necessary in order to accommodate within the limited space a sufficient length of tubing to obtain the desired time constant. The time constant is usually made high enough so that the recurring fluid pressure impulses caused by the automatic steering device, which cancel out as long as the craft is properly trimmed, do not register. However, if a persistent pressure differential continues over a period longer than the time constant of the indicator, the pointer will move to show just how much adjustment of trim is necessary. Pipes 21 and 21' are connected to the fluid pressure system which operates the servomotor 22 or servomotors 22 and 23, if trim tab control is employed (Fig. 7). This figure represents diagrammatically the portion of the airplane automatic pilot used to operate the elevator controls and is similar to that shown in my aforesaid patent, the pipes 21 and 21' being tapped into the main pipes 24 and 24' between the relay 25, connected to the oil pump, and the servomotors. In this figure, the automatic control is represented as enclosed within the dotted lines 26 and shown as of the gyroscopic type with the air pick-off arrangement 27 controlling a master piston or diaphragm 28 operating the relay 25. It is to be understood, however, that my indicator may equally well be connected into any fluid pressure servomotor system, whether automatically controlled or manually. The service elevator in this figure is indicated at 31, normally operated either from the cylinder 23 or by direct manual control, indicated by the handle 30.

In operation, if the oil pressure is persistently greater on one side of the cylinder 22 than on the other, this will be indicated by my indicator moving to show either tail heaviness or nose heaviness, whichever the case may be, and if this condition is not corrected by the operation of the cylinder 23, or if such cylinder is not used to correct the position of the auxiliary trim surface 29, the operator turns the handle 30 to make the desired correction.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. A trim indicator for airplanes having a hydraulically operated reversible servomotor for controlling the elevator, comprising a variable indicating device and differential pressure means responsive to continuing variations in the relative pressure to the two sides of said motor for operating said device to show normal, nose heavy and tail heavy trim conditions, said means having flow restricting means associated therewith for keeping said indicator stationary during rapidly recurrent opposite variations of said relative pressure.

2. A trim indicator for airplanes having a hydraulically operated reversible servomotor for controlling the elevator, comprising a pivoted indicator, a pair of pressure responsive devices oppositely connected to said indicator to move the same one way or the other from its normal position to show nose or tail heaviness, two pipe lines connected to said servomotor, means for differentially varying the pressure therein, for operating the elevator, and capillary tubes connecting said pressure devices to said pipes, said capillary tubes having a time constant of a magnitude to prevent short time recurring opposite pressure variations from moving said indicator.

3. A trim indicator for airplanes having a hydraulically operated reversible servomotor for controlling the elevator, comprising a pivoted indicator, a pair of pressure responsive devices, a rocker arm against the two ends of which said devices bear, an arm projecting therefrom, a shaft to which said indicator is secured, a pin and slot connection between said arm and shaft to rotate the shaft through a greater angle than the rocker arm rotates, and pipe connections having flow restricting means between said devices and said servomotor, whereby said indicator is actuated upon continuing unequal pressure in said pipes.

4. In a hydraulic automatic pilot for aircraft having both service and trim elevation control surfaces, a hydraulic servomotor for each, the trim motor being slowly responsive to the predominant pressure in said service motor, and a trim indicator also connected to the hydraulic supply for said motors and slowly responsive to the predominant pressure therein to check the operation of the trim control motor.

BERT G. CARLSON.